United States Patent [19]

Nakamura

[11] Patent Number: 4,921,087

[45] Date of Patent: May 1, 1990

[54] PICKING APPARATUS

[75] Inventor: Katsunari Nakamura, Tokyo, Japan

[73] Assignee: Fuji Electric Co., Ltd., Kawasaki, Japan

[21] Appl. No.: 378,469

[22] Filed: Jul. 12, 1989

Related U.S. Application Data

[63] Continuation of Ser. No. 145,769, filed as PCT JP87/00266 on Apr. 25, 1987, published as WO87/06563 on Nov. 5, 1987, abandoned.

[30] Foreign Application Priority Data

Apr. 30, 1986 [JP] Japan ................... 61-100077

[51] Int. Cl.$^5$ .............................................. B65G 47/46
[52] U.S. Cl. ..................................... 198/350; 198/356; 414/273
[58] Field of Search ................. 198/350, 349, 370, 356

[56] References Cited

U.S. PATENT DOCUMENTS

| | | | |
|---|---|---|---|
| 3,854,889 | 12/1974 | Lemelson | 198/349 X |
| 3,889,797 | 6/1975 | Naito et al. | 198/350 X |
| 3,915,284 | 10/1975 | Knockheart et al. | 198/349 |
| 4,053,741 | 10/1977 | Ainoya et al. | 198/349 X |

FOREIGN PATENT DOCUMENTS

| | | | |
|---|---|---|---|
| 3010637 | 9/1981 | Fed. Rep. of Germany | 198/349 |
| 3225607 | 3/1984 | Fed. Rep. of Germany | 198/350 |
| 2306144 | 10/1976 | France | 198/350 |
| 52-153575 | 12/1977 | Japan . | |
| 59-4504 | 1/1984 | Japan . | |
| 61-81301 | 4/1986 | Japan . | |
| 61-81302 | 4/1986 | Japan . | |
| 61-81303 | 4/1986 | Japan . | |
| 61-81305 | 4/1986 | Japan . | |
| 61-81317 | 4/1986 | Japan . | |
| 61-81318 | 4/1986 | Japan . | |
| 1113337 | 9/1984 | U.S.S.R. | 198/349 |

OTHER PUBLICATIONS

Födern und heben, 1984, no. 11, pp. 829–833 (translation enclosed).
Development of High Speed Automatic Picking System for Small Package at the Kinki Distribution Center of Shiseidō Co., Ltd. "IHI Engineering Review", pp. 33-38, vol. 16, No. 1, 1983.

Primary Examiner—Frank E. Werner
Assistant Examiner—D. Glenn Dayoan
Attorney, Agent, or Firm—Brumbaugh, Graves, Donohue & Raymond

[57] ABSTRACT

By providing a wireless communication between a main control unit of an article picking apparatus, a main control device for supply devices and a route setting device and attaching a data carrier having a writable/erasable memory to a mobile article picking container, information concerning kind, number, etc. of articles to be supplied to the picking container is transmitted from the main control device to the data carrier to be stored therein. During transportation of the picking container, the data carrier transmits stored picking information in response to a calling signal from the route setting device, while the route setting device sets a transport route for the picking container based on the received picking information. The data carrier transmits the stored picking information to the control device in response to the calling signal from the main control unit and the control device for the article supply controls the supply device based on the picking information and the supply device supplies articles to the picking container. A result information including the kind and number of articles actually supplied to the article picking container, the difference between instructed amount and actual supply value, etc. is transmitted to the data carrier, and stored therein to be utilized in the subsequent article collecting step. In this way, the information processing during the picking process can be dispersed and simplified, by which the duty on the main control device is remarkably moderated as compared with that in the prior art, the transportation route selection is facilitated, the time for picking is shortened, and the efficiency for utilizing the apparatus is improved.

6 Claims, 4 Drawing Sheets

PICKING APPARATUS

This application is a continuation of application Ser. No. 145,769, filed as PCT TP87/00266 on Apr. 25, 1987, published as WO87/06563 on Nov. 5, 1987, now abandoned.

TECHNICAL FIELD

The present invention relates to a picking apparatus used in the distribution field, manufacturing and assembling field, etc. for automatically picking articles such as goods or parts and it particularly relates to a picking apparatus, wherein a data carrier having a writable erasable memory means and a wireless communication means is attached to a picking container that receives supply of articles in the course of picking articles, and the transport of the picking container and collection of articles are conducted based on the information inputted and stored in the data carrier, so that run-over, transport route selection, transport at different speed can be conducted with ease upon transport of the picking container, the picking container under transportation can be withdrawn from the conveying path with no troubles, the time required for article picking can be shortened and the information processing can be dispersed and simplified.

BACKGROUND ART

Heretofor, the apparatus of this kind, as shown in FIG. 1, in which articles are automatically collected by the correspondence of a bar code attached on a picking container to the picking information stored in a main control device has been put to practical use. In the figures are shown, a main control device 30, control devices 33a, 33b, supply devices 19a, 19b, a picking container 10, a bar code 31, a bar code reader 32, a route control section 34 for constituting a route setting device, a route setting actuator 14, transport route 22, 24, 25 comprising conveyors, etc. that constitute transport means for transporting picking containers, a picking line 22, a missing line 24 and a repacking line 25.

The main control device 30 has stored therein picking information B such as the container number for each of the picking containers, kind and number of articles to be picked in each of the picking containers, etc. The picking container 10 is provided with the bar code 31 corresponding to the container number. When the picking container 10 is transported on the picking line 22 and arrives at an inlet for a group of supply devices for supplying articles to the picking containers 10, the bar code reader 32 reads the bar code on the picking container 10 and transmits container information A to the main control device 30. Upon receiving the container information A, the main control device 30 designates the supply device 19a which supplies articles to the picking container 10 based on the container information A and the previously stored picking information B and sends supply instruction Da including a timing information for article supply calculated based on the conveyor speed, position for the supply device, opening length of the picking container, etc. to the control device 33a of the supply device 19a. The control device 33a generates supply instruction D (Da) based on the received picking information Ba to actuate the supply device 19, by which articles are supplied from the supply device 19a to the picking container 10. A sensor 20a disposed adjacent to the article supply port of the supply device 19a monitors the actual supply value of the articles and if it does not agree with an instructed supply value, a result information E (Ea) including the information for the lacking of articles is fed back from the control device 33a to the main control device 30. A picking container having completed a series of picking is conveyed along a predetermined path, whereas if lacking of articles or excess supply is resulted, the main control device 30 sends a route information R to the route control section 34 based on the result information E (Ea, Eb). Upon receiving the route information R, the route control section 34 generates a route setting instruction R to actuate the route setting actuator 14 thereby displacing the picking containers resulting in the lacking of articles or excess supply to the missing line 24 which is the path different from that for the picking containers having picked articles exactly and distinguishing it as the article missing container so that it can be processed separately.

In this way, in the conventional picking apparatus, after the container number has been read once at the inlet of the group of supply devices, since it is tracked by the main control device with no external information input, it is ordinary that the picking containers are transported in the identical order, at the identical speed and along the identical path. Therefore, an identical time is required for the article collection both in the case of picking articles of one kind and of a small number of pieces and in the case of picking articles of various kinds and many number of pieces. Since a plurality of picking containers are tracked at the same time, the information processing in the main control device is complicated to extremely increase the load on the computer of the main control device.

There has been an apparatus in which a bar code reader is disposed on every inlet for each of the supply devices for designating as to whether the articles may be supplied or not from the main control device every time the picking container reaches the inlet for each of the supply devices, but this greatly increases the number of bar code readers disposed and also increases the duty of the main control device.

Also, in an apparatus adapted to change the transport route when supply of designated articles has been completed at the initial stage in the group of the supply devices and bypass the remaining supply devices, the duty on the main control device is increased.

DISCLOSURE OF THE INVENTION

The present invention has been accomplished in view of the foregoing and it is an object thereof to provide a picking apparatus capable of run-over, route selection, transporting at different speeds in the transport of picking containers, improving the efficiency for utilizing the apparatus by shortening the picking time, dispersing and simplifying the information processing to moderate the duty on the main control device, as well as capable of withdrawing the picking container during transport.

For attaining the foregoing object, the present invention provides a picking apparatus comprising a main control device, a transport device containing a plurality of transport routes, supply devices disposed along the transport device, picking containers conveyed along the transport routes for receiving the supply of articles from the supply devices, control device for controlling the supply devices, sensors for monitoring the supply of articles in the supply devices and a route setting device disposed at each junction of the transport routes of the transport device for switching the transport routes, wherein each of the main control device, the control device of the supply devices and the route setting device has a wireless communication means, the picking container having attached thereto a data carrier having writable erasable memory means and a wireless communication means, the data carrier being adapted for remote communication to and from the main control device, the control device or the route setting device, information concerning kind, number, etc. of articles to be received from the supply device by the picking container is transferred from the main control device to the data carrier, the information is transmitted from the data carrier to the control device for each of the supply devices and to the route setting device for article supply and route setting, or the information concerning the error of supply caused in the course of article picking is transmitted from the control device of the supply device to the data carrier and stored in the data carrier.

DESCRIPTION OF THE PREFERRED EMBODIMENT

The preferred embodiment of the present invention will be explained in more detail with reference to the accompanying drawings.

Figure 2:
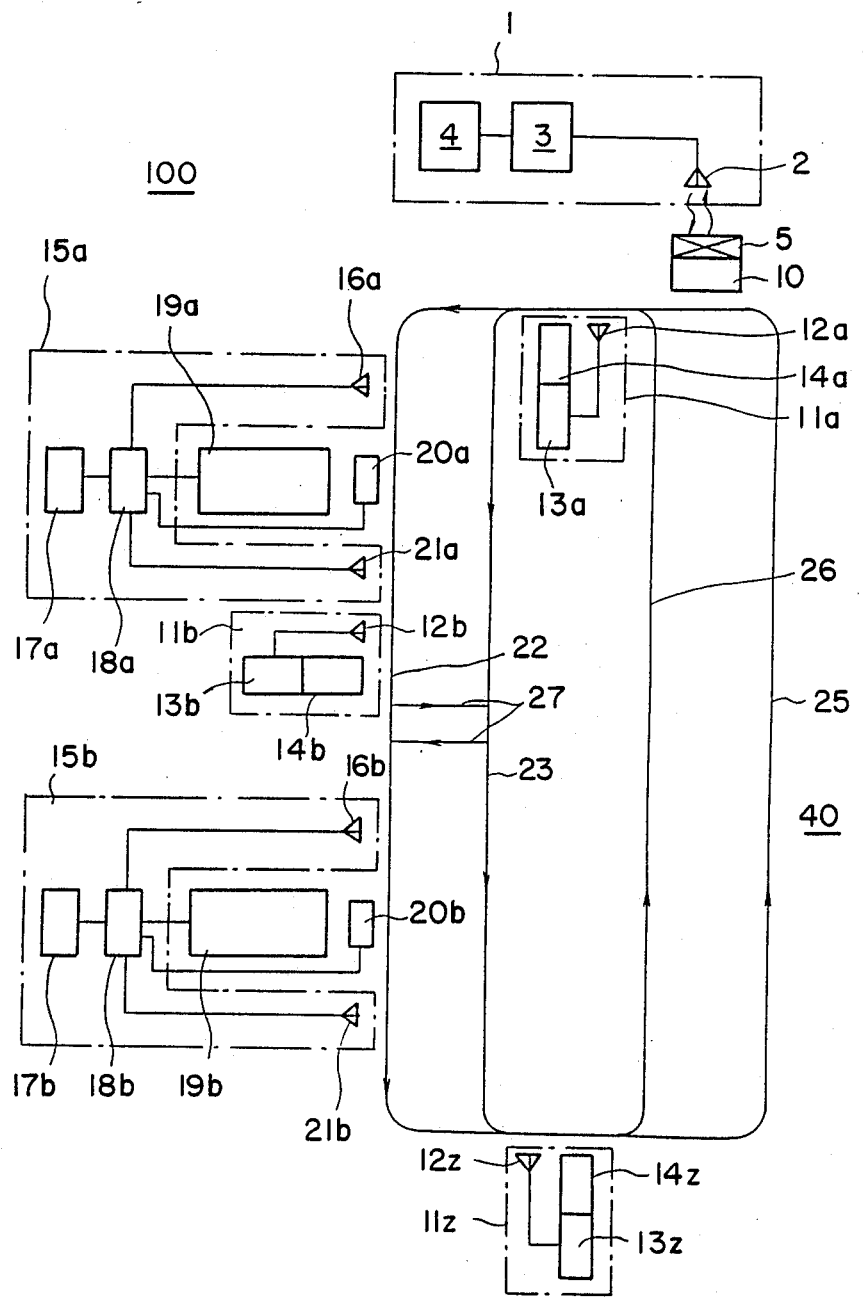
FIG. 2 is a schematic explanatory view illustrating the constitution of a picking apparatus according to the present invention.

In FIG. 2, the picking apparatus 100 mainly comprises a main control device 1, a transport device 40 comprising a picking line 22, a bypass line 23, a re-packing line 25, a re-picking line 26, and a traverser 27 that connects the picking line 22 with a bypass line 23, two supply devices 19a, 19b disposed along the picking line 22, control devices 15a, 15b for controlling the supply devices and inputted with the output from the sensor for monitoring the supply of the articles, and route setting devices 11a, 11b and 11z disposed at the junctions of the transport routes of the conveying device 40 for switching the transport routes, so that the picking containers 10 are transported along a predetermined route by the transport device 40 and receive the supply of the articles from the supply device. Although two supply devices 19a and 19b are shown in the embodiment of FIG. 2, the number of the supply devices that can be disposed is not restricted only thereto.

Figure 3:
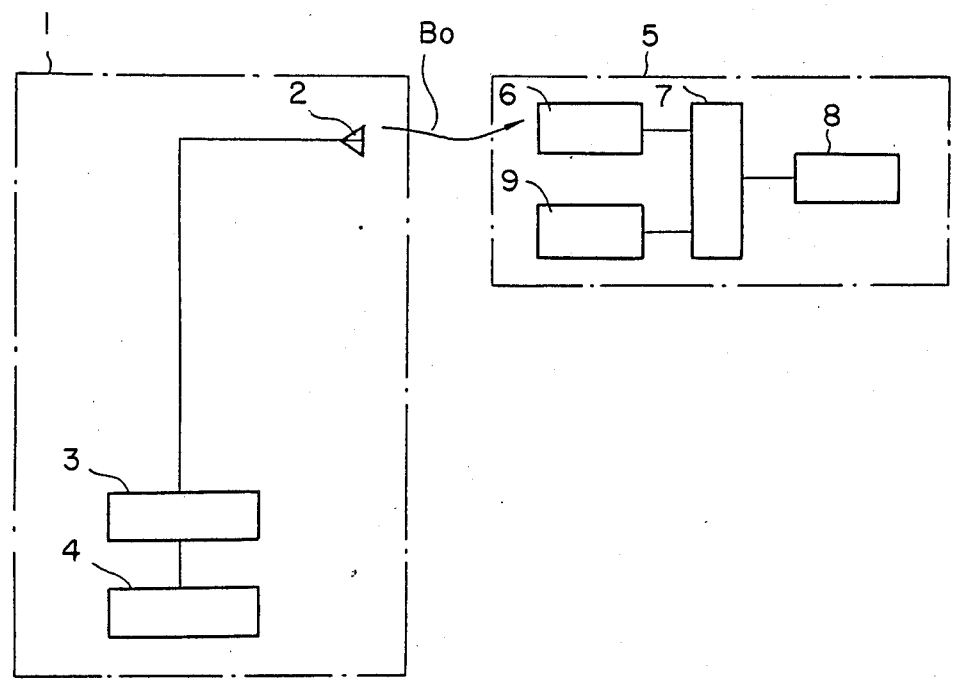
FIG. 3 is a block diagram illustrating the constitution of the main control device and the data carrier constituting the picking apparatus according to the present invention.

In FIG. 3, the main control device 1 comprises an antenna 2, a control section 3 and a computer 4, in which picking information such as the kind and the number of articles to be supplied to each of the picking containers is memorized in a not illustrated memory section of the computer 4. An interrogation signal and the picking information Bo are sent on electromagnetic waves from the control section 3 by way of the antenna 2 to the data carrier 5 attached to picking container 10. The picking information Bo is information concerning articles to be supplied to the particular picking container included within the picking information B inputted to the main control device. The data carrier 5 comprises a receiving section 6, a control section 7, a memory section 8 provided with a writable erasable memory and a transmission section 9. The receiving section 6 receives the interrogation signal and the picking information transmitted from the main control device 1, and the picking information is stored in the memory section 8. A memory capacity of about several K bits is sufficient for the data carrier.

Figure 4:
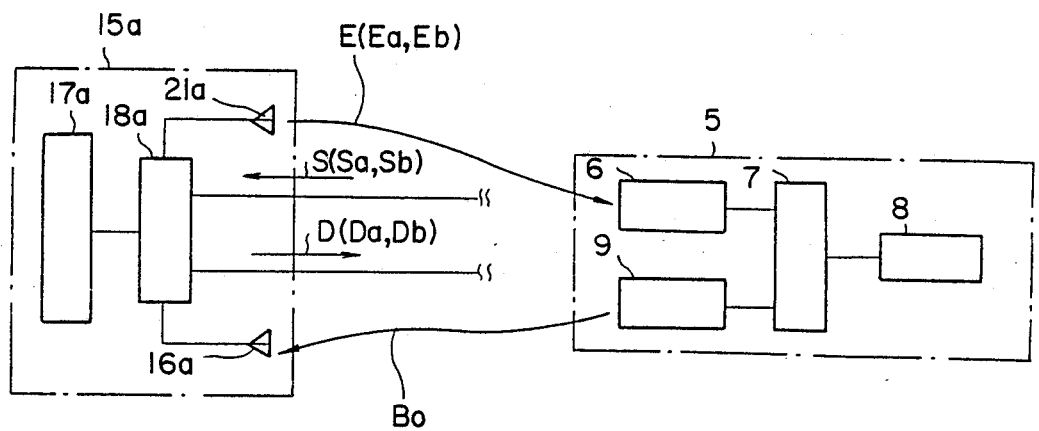
FIG. 4 is a block diagram illustrating the constitution of the control device of the supply device and the data carrier.

Explanation will now be made for the step of picking by the picking apparatus according to the present invention referring to FIG. 4 and FIG. 5. The picking information Bo is transmitted from the main control device 1 by way of the antenna 2 to the data carrier 5 attached to an empty picking container 10 as already explained referring to FIG. 3. The transmission section 9 of the data carrier 5 attached to picking container 10 transmits the picking information Bo stored in the data carrier 5 to the route setting device 11a in response to the interrogation signal generated by way of the antenna 12a. The interrogation signal acts as an enabling signal which when received by the data carrier prompts the data carrier to transmit picking information Bo. The route setting device 11a processes the received picking information Bo in the not illustrated data processing device of the path control section 13a comprising CPU, RAM, ROM, not shown, to actuate the route setting actuator 14a. Assuming a case where it is judged that a picking container 10 is to receive articles from supply device 19a, the route setting device 11a places the picking container 10 on the picking line 22. If, on the other hand, it is not necessary that picking container 10 receive articles from supply device 19a, route setting device 11a places the picking container 10 on the bypass line 23 and transports it at a high speed. The route setting actuator 14a of the route setting device 11a may be either a system for opening and closing the transport path, or a system for pushing the picking container to a predetermined path.

The receiving section 6 of data carrier 5 attached to the moving picking container 10 being transported on the picking line 22 receives the interrogation signal transmitted from the control device 15a of supply device 19a by way of the antenna 16a and transmits the picking information Bo stored in the memory section 8 by way of the transmission section 9 to the control device 15a. The control device 15a transmits the picking information Bo received by the antenna 16a to the data processing device 17a by way of the control section 18a, where a supply instruction Da is prepared based on the picking information Bo and transmitted by way of the control section 18a to the supply device 19a (refer to FIG. 4, FIG. 5). The supply device 19a supplies the designated number of articles of the designated kind to the picking container 10 based on the supply instruction Da.

In the picking apparatus 100 shown in FIG. 2, the supply device is divided into two parts 19a, 19b, each of which may be a single supplying machines or a group of supply machines consisting of a plurality of machines for supplying articles of a plurality of kinds. Where the supply device comprises a group of supply machines, the supply machines may be disposed in parallel with or perpendicular to the transport direction of the transport route. There is further a rotary tray type supply device. In the case where the supply device comprises a group of supply machines disposed in parallel with the transport direction, timing information for the supply of articles calculated from the transport speed, position of the supply machines, opening length of the picking container, etc. is added to the supply instruction in the associated control device 15a or 15b and the supply machine supplies articles as designated by the timing information. The timing of the article supply may be set by clock pulses outputted from internal clocks of the CPU included in the control device.

The sensor 20a is disposed at the article supply port of the supply device 19a and monitors the actual number of articles supplied. The actual number of the supplied articles is inputted to the control device 15a and compared with the designated supply number. If there is an excess or insufficiency, a result information Ea is transmitted by way of the antenna 21a disposed at the exit of the supply device 19a and written into the memory section 8 of the data carrier 5 attached to the picking container 10.

After the picking container 10 has received the supply of articles from the block 19a of the supply device, the data carrier attached thereto transmits the stored picking information Bo to the route setting device 11b in response to the interrogation signal generated from the route setting device 11b disposed on the side of the exit of the block 19a of the supply device by way of the antenna 12b. The route setting device 11b judges whether or not it is necessary for the picking container 10 to receive any articles from the block 19b of the supply device based on the received picking information Bo and, if not, it displaces the picking container 10 by way of the traverser 27 to the bypass line 23, whereas if additional articles are necessary, it displaces the article collecting container 10 along the picking line 22.

In the case where a picking container is not required to receive articles from the block 19a of the supply device but is required to receive articles from the block 19b of the supply device, it is transported on the bypass line 23 and the receiving section 6 of its associated data carrier 5 receives an interrogation signal generated from a not illustrated route setting device disposed at the junction point between the bypass line 23 and the traverser 27, whereupon the picking information Bo stored in its memory section 8 is transmitted from the transmission section 9 to the route setting device. The route control section of the route setting device actuates the route setting actuator based on the article collecting information Bo, displaces the picking container from the bypass line 23 by way of the traverser 27 to the picking line 22, and then the picking container is transported to the block 19b of the supply device.

The block 19b of the supply device, the control device 15b and the route setting device 11z have the same construction and function as those in the supply device 19e, control device 15a and route setting devices 11a, 11b, respectively. The route setting device 11z is used for distributing the picking containers having completed the picking as instructed into the re-packing line 25, and the picking containers lacking in articles into the re-picking line 26, respectively.

A picking container 10 that has completed the picking and then emptied upon the re-packing line receives new picking information again from the main control device 1, erases the previously stored picking information and is prepared for a new picking step.

On the other hand, a picking container lacking in articles is again placed by way of the re-picking line 26 on the picking line 22 and receives articles from the supply device to supplement such lacked articles. In the step of supplying such lacking articles, the result information Ez inputted and stored in the previous picking step together with the picking information Bo are transmitted from the data carrier to the control device of the supply device, which outputs a supply instruction (lacked article supplement instruction) to supply device based on information.

Figure 1:
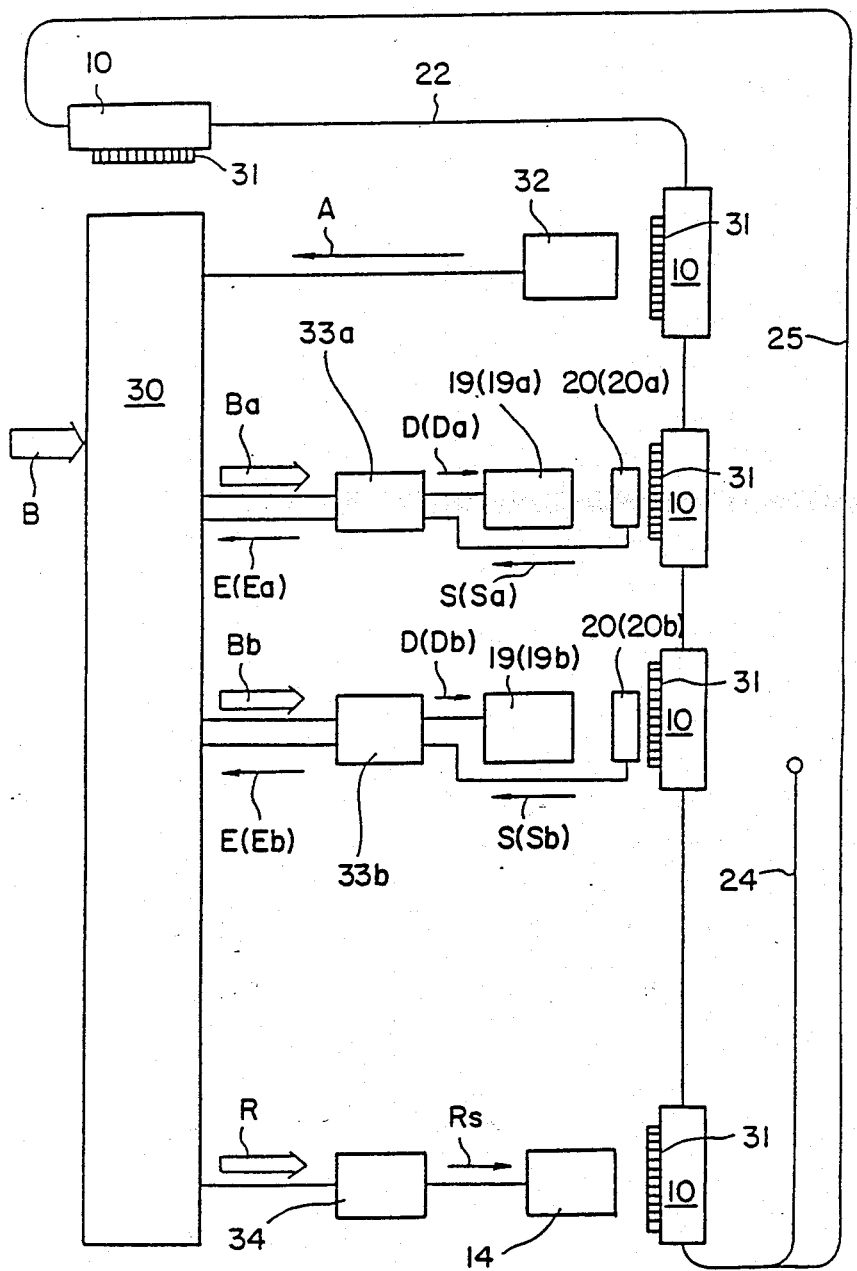
FIG. 1 is a schematic explanatory view illustrating the constitution of a picking apparatus and the flow of the main information and instruction in the prior art.
Figure 5:
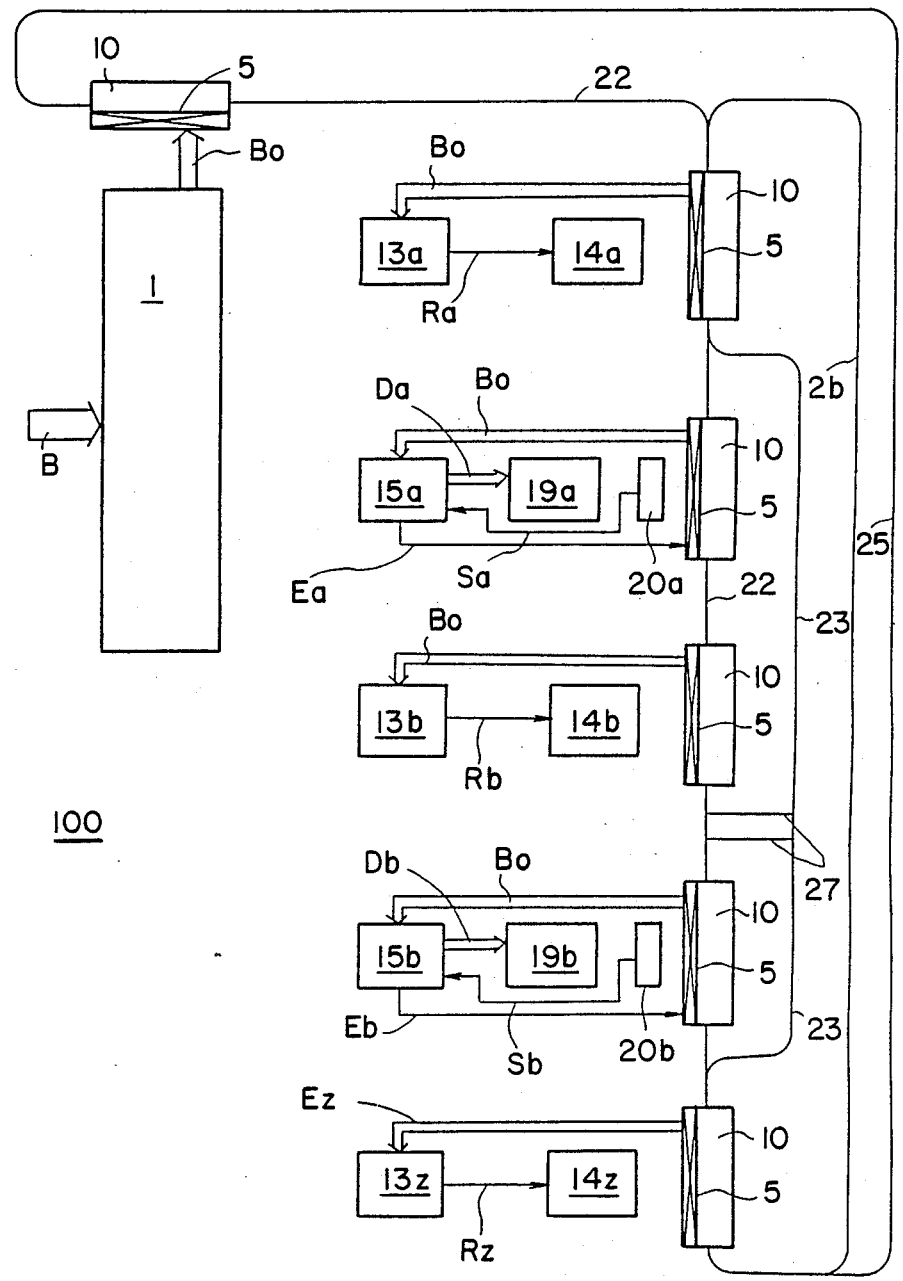
FIG. 5 is a schematic explanatory view illustrating the flow of main information and instruction in the picking apparatus shown in FIG. 1.

Now, the flow of information in the picking apparatus according to the present invention and the picking apparatus according to the prior art are compared referring to FIG. 5 and FIG. 1. In the picking apparatus of the prior art shown in FIG. 1, the container information A, picking information B and the result information Ea, Eb are inputted into the main control device 30 and the picking information Ba, Bb and the route information R are outputted from the main control device 30. Further, the main control device 30 has to determine the timing information required for adjusting the timing as to when the supply device supplies articles to the container every time articles are supplied and transmit it to the control devices 33a, 33b. Then, most of the information is centralized to the main control device 30 and most of the information processing is conducted in the main control device 30.

On the other hand, in the picking apparatus according to the present invention as shown in FIG. 5, after the main control device 1 has extracted the picking information Bo concerned with the picking container 10 from the inputted article picking information B and has transmitted it to the data carrier 5, the control for specified picking container in the course of picking is transferred to the control devices 15a, 15b for controlling the individual supply devices 19a, 19b and the route control sections 13a, 13b of the route setting devices 11a, 11b, by which the duty on the main control device is remarkably reduced. The picking information Bo concerning the individual picking containers is stored in the data carrier 5 attached to the picking container 10 and, on every setting for the picking route and article supply, the stored picking information Bo is taken out and utilized. The picking information Bo is inputted from the data carrier 5 to the route setting devices 11a, 11b and to the control devices 15a, 15b of the supply devices. In the step of picking, the result information Ea, Eb is inputted from the control devices 15a, 15b to the data carrier 5. Further, the result information Ez inputted to and stored in the data carrier in the step of the picking is inputted to the route setting device 11z for switching the re-picking line 26 and the repacking line 25. The result information Ez is constituted with the result informations Ea, Eb for each of the article supply devices.

In this way, the information processing can be dispersed and simplified in the step of the picking by providing each of the individual picking containers with a data carrier having a writable erasable memory means and a wireless communication means and enabled for remote communication to and from the main control device, the control device and the route setting device.

INDUSTRIAL APPLICABILITY

As has been described above according to the present invention, each of the main control device, the control devices for the supply devices and the route setting device is provided with wireless communication means, the picking container is provided with a data carrier having a writable erasable memory means and a wireless communication means so that the data carrier enables remote communication to and from the main control device, the control device and the route setting device, information regarding the kind, number, etc. of articles to be supplied from the supply devices to the picking container is transmitted from the main control device to the data carrier and stored therein, the information is transmitted on every supply of articles and route setting from the data carrier to the control device of the supply device and the route setting device, respectively, or information concerning the result of the supply and the error of supply in the step of picking is transmitted from the control device of the supply device to the data carrier and stored therein. Accordingly, the information processing in the steps of the picking can be dispersed and simplified and the duty on the main control device can be remarkably moderated as compared with that in the prior art. In addition, the selection for the route in the step of picking is facilitated and it is possible to shorten the time for picking and improve the efficiency for utilizing the apparatus. Further, since the information processing can thoroughly be dispersed, the scale of a system for the picking apparatus (the number of the supply devices used) can easily be extended or contracted within the extent of the memory capacity of the data carrier. Furthermore, if the picking container is withdrawn for some reason during transportation, it will not affect the operation of the rest of the picking apparatus.

I claim:

1. An apparatus for automatically picking articles supplied by supply device means disposed along a picking line of a transport device having a plurality of transport routes including said picking line and re-picking and re-packing lines which intersect said picking line, and at least one transverse line connecting said picking line to a by pass line, said apparatus comprising:
   at least one picking container adapted to be conveyed along the transport routes of said transport device;
   a plurality of supply device means disposed along said picking line for controllably supplying articles to a picking container on said picking line, each said supply device means including control device means, wireless communication means, and a sensor for monitoring a supply of articles;
   a plurality of route setting devices each including wireless communication means, one located at each intersection of said transport routes of said transport device for controllably transferring a picking container from one of said transport routes to another;
   a main control device having a wireless communication means for transmitting picking information; and
   a data carrier attached to said at least one picking container, said data carrier including a signal receiving section, a control section, a signal transmission section and a memory section, for receiving from said main control device picking information including data indicative at least of the kind and number of articles to be supplied to its associated picking container, for storing said received information in said memory section, for transmitting said stored picking information through said signal transmission section to said route setting devices and to said control device means of said supply device means, and for storing in said memory section result information including data indicative at least of excess or shortage in articles supplied by said supply device means to said at least one picking container, whereby picking of articles is executed based on said picking or result information stored in the memory section of a data carrier thereby to disperse information processing tasks and thus reduce the information processing load of said main control device.

2. Picking apparatus according to claim 1, wherein said at least one data carrier in response to an interrogationsignal received from one of said supply devices or from one of said route setting devices transmits picking information stored therein to said one supply device or to said one route setting device which, based on said picking information, directs the picking container associated with said at least one data carrier to the proper transport route to be supplied for a supply device with the correct kind and number of articles.

3. Picking apparatus according to claim 1 wherein the picking information transmitted by said main control device further includes data indicative of the supply device means which are to supply stored articles to a picking container in a round picking.

4. Picking apparatus according to claim 1, wherein one of said route setting devices, in response to received data indicative of what kind of articles are to be supplied to said at least one picking container, selects one of said transport routes for said picking container.

5. Picking apparatus according to claim 1 or claim 3, wherein the control device means of the supply device means transmits result information, including data indicative of the supply of articles stored by said supply device means obtained by processing an output signal from said sensor for monitoring its supply of articles to the data carrier attached to said at least one picking container for storage in the memory section thereof.

6. Picking apparatus according to claim 1 or claim 3, wherein a route setting device disposed at a point near an end of said picking line, in response to data transmitted from the data carrier attached to said at least one picking container and including data indicating a deficit in the number of articles actually supplied to said at least one picking container, transfers said at least one picking container onto said re-picking line.

* * * * *